(12) United States Patent
Whitehead

(10) Patent No.: US 12,491,675 B2
(45) Date of Patent: Dec. 9, 2025

(54) SYSTEM AND METHOD FOR FORMING OF 3D PLASTIC PARTS

(71) Applicant: SCRAPE ARMOR, INC., Bellevue, WA (US)

(72) Inventor: Scott Whitehead, Bellevue, WA (US)

(73) Assignee: SCRAPE ARMOR, INC., Bellevue, WA (US)

( * ) Notice: Subject to any disclaimer, the term of this patent is extended or adjusted under 35 U.S.C. 154(b) by 0 days.

(21) Appl. No.: 18/652,595

(22) Filed: May 1, 2024

(65) Prior Publication Data
US 2024/0278481 A1  Aug. 22, 2024

Related U.S. Application Data

(63) Continuation of application No. 18/077,546, filed on Dec. 8, 2022, now abandoned, which is a continuation of application No. 16/259,844, filed on Jan. 28, 2019, now abandoned, which is a continuation-in-part of
(Continued)

(51) Int. Cl.
| | |
|---|---|
| *B29C 51/10* | (2006.01) |
| *B21D 26/021* | (2011.01) |
| *B29C 33/38* | (2006.01) |
| *B29C 51/26* | (2006.01) |
| *B29C 51/42* | (2006.01) |
| *B60R 19/03* | (2006.01) |
| *C03B 37/14* | (2006.01) |
| *G06F 30/15* | (2020.01) |

(Continued)

(52) U.S. Cl.
CPC ............ *B29C 51/10* (2013.01); *B21D 26/021* (2013.01); *B29C 33/3835* (2013.01); *B29C 33/3842* (2013.01); *B29C 51/266* (2013.01); *B29C 51/421* (2013.01); *C03B 37/14* (2013.01); *G06F 30/15* (2020.01); *B29K 2911/14* (2013.01); *B29L 2031/3044* (2013.01); *B60R 19/03* (2013.01); *G06F 2119/18* (2020.01)

(58) Field of Classification Search
CPC . B29C 33/3835; B29C 33/3842; B29C 51/10; B29C 51/421; B60R 19/03; B21D 26/021
See application file for complete search history.

(56) References Cited

U.S. PATENT DOCUMENTS

| | | |
|---|---|---|
| 6,257,866 B1 | 7/2001 | Fritz et al. |
| 9,610,726 B1 | 4/2017 | Upton et al. |
| 11,607,836 B1 | 3/2023 | Johnson, VII |

(Continued)

*Primary Examiner* — Gregory A Blankenship
(74) *Attorney, Agent, or Firm* — Richard Thomas Black; Bryan A. Santarelli; FISHERBROYLES LLP

(57) ABSTRACT

Systems and methods for forming 3D plastic parts that are cost effective in low volume, have excellent fit and finish, and use many components from 2D construction are disclosed. The systems and methods involve selecting a design and modelling the design. The design comprises 2D and 3D components of plastic parts. A 3D forming buck corresponding to the 3D component is manufactured. At least one of a 2D part and the 3D forming buck may be heated. The 2D part may be loaded onto the 3D forming buck for a predefined period of time. The 3D part formed after the loading may be separated from the 3D forming buck. The 3D part is the 2D part generally having taken the shape of the 3D forming buck. The 3D part may be cooled to obtain an end product.

13 Claims, 5 Drawing Sheets

Related U.S. Application Data application No. 15/236,235, filed on Aug. 12, 2016, now Pat. No. 10,272,862.

(60) Provisional application No. 62/623,402, filed on Jan. 29, 2018, provisional application No. 62/282,896, filed on Aug. 14, 2015.

(51) Int. Cl.
 *B29L 31/30* (2006.01)
 *G06F 119/18* (2020.01)

(56) References Cited

U.S. PATENT DOCUMENTS

| | | |
|---|---|---|
| 2005/0112330 A1 | 5/2005 | Suzuki et al. |
| 2006/0167582 A1 | 7/2006 | Jayko |
| 2007/0026201 A1 | 2/2007 | Botrie et al. |
| 2007/0191198 A1 | 8/2007 | Distel |
| 2008/0251975 A1 | 10/2008 | Gallagher et al. |
| 2017/0001339 A1 | 1/2017 | Boisson et al. |
| 2017/0015066 A1 | 1/2017 | Herrmann et al. |
| 2017/0129159 A1 | 5/2017 | Devlin et al. |
| 2017/0144361 A1 | 5/2017 | Hills et al. |
| 2017/0165897 A1 | 6/2017 | Saelen |
| 2018/0104863 A1 | 4/2018 | Cottrell et al. |
| 2018/0326922 A1 | 11/2018 | Dellock et al. |
| 2019/0084215 A1 | 3/2019 | Fujita |
| 2019/0291333 A1 | 9/2019 | Whitehead |
| 2021/0292019 A1 | 9/2021 | Chevalier et al. |
| 2021/0402934 A1 | 12/2021 | Tansingco |
| 2022/0009135 A1 | 1/2022 | Taguchi et al. |
| 2022/0101758 A1 | 3/2022 | Schutte |
| 2022/0118674 A1 | 4/2022 | Handell et al. |
| 2022/0396228 A1* | 12/2022 | Whitehead .............. B62D 35/02 |
| 2023/0059100 A1 | 2/2023 | Sato |
| 2024/0278481 A1* | 8/2024 | Whitehead .............. B29C 51/10 |

* cited by examiner

2D ADJUSTMENTS MADE BEFORE 3D FORMING DURING PRE-DISTORTION STATE.

SYSTEM AND METHOD FOR FORMING OF 3D PLASTIC PARTS

CROSS-REFERENCE TO RELATED APPLICATIONS

This application is a continuation of U.S. patent application Ser. No. 18/077,546 filed Dec. 8, 2022, which is a continuation of U.S. patent application Ser. No. 16/259,844 filed Jan. 28, 2019, which application is a Continuation-in-Part of U.S. patent application Ser. No. 15/236,235 filed Aug. 12, 2016 (now U.S. Pat. No. 10,272,862 issued Apr. 30, 2019); which application claims priority to both U.S. Provisional Patent Application Ser. Nos. 62/282,896 filed Aug. 14, 2015 and 62/623,402 filed Jan. 29, 2018, the contents of which are hereby incorporated by reference in their entirety as if fully set forth herein.

COPYRIGHT NOTICE

This disclosure is protected under United States and/or International Copyright Laws. ©2022 Scrape Armor, Inc. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Plastic parts are used in almost every industry. In many industries, it is cost prohibitive to create a unique part for every variation of a design, especially where the part is manufactured in relatively low volume. In the automotive industry, for example, an aftermarket part for the front fascia of a car may become obsolete when the automobile manufacturer updates or tweaks the design of the car. Or, alternatively, there may be numerous variations of the same model of car, depending on the package selected. In this example, developing unique plastic components for each variation is often not feasible without economies of scale. Traditional methods for forming 3D plastic parts include injection molding, extrusion molding, pressure or blow molding, etc. All of these have discrete disadvantages. Injection molding, for example, is well suited to high volume manufacture. However, where volume will be low and where the design requirements may change rapidly, thereby rendering the expensive mold obsolete, injection molding is not ideal. Extrusion molding is likewise very expensive, and requires post-mold cutting of excess which makes fine edge details more difficult to recreate. Another option would be to create billet parts out of a single piece of material, ground away to reveal the final shape, this too is prohibitively expensive, as it results in excess waste of material. Further disadvantages associated with the traditional methods for forming 3D plastic parts include the need for unique and expensive machinery, which may not be used for 2-dimensional ("2D") counterparts.

In contrast to the above, 2D parts are generally very simple to create, requiring a mill, a conventional (non-multiaxis) computer numerical control tool ("CNC"), or table router, for example. Accordingly, there is a need for a method of forming 3D plastic parts that is cost effective in low volume, provides excellent fit and finish of the end product, and further that reuses as many components from 2D construction as possible.

According to an aspect, a method of forming three dimensional (3D) plastic parts is disclosed. The method described herein includes selecting a design and modelling the design. The design may comprise 2D and 3D components of plastic parts. The method may then involve manufacturing a 3D forming buck corresponding to the 3D component. The 3D forming buck may have at least one of contour, distortion, perforation, and locations for fasteners, present in plurality of axes and plurality of planes. Subsequently, the method involves heating at least one of a 2D part and the 3D forming buck. The 2D part may be loaded onto the 3D forming buck for a predefined period of time. Accordingly, the method involves separating a 3D part formed after the loading. The 3D part is the 2D part generally having taken the shape of the 3D forming buck. Further, the 3D part is cooled to form an end product.

In an embodiment, the modelling may utilize at least one of a computer aided design (CAD) file and scanning of physical models, molds, and wire reconstructions. The CAD file may be adjusted in order to ensure the 2D part, when molded into 3D is of the correct design. The design may be of a part of a vehicle. The 3D forming buck may be obtained through one of milling, multi-axis milling and sand casting. The 2D part may utilize a flat plate made using one of thermoplastic olefins (TPOs), polycarbonates, polyesters, polypropylene, polyurethanes, polyamides, glass fiber, and aluminum. The 3D forming buck may be made out of wood or any other suitable material. The flat plate may be subjected to a predefined temperature in order to increase pliability and ensure consistent molding.

In another embodiment, the method of forming three dimensional (3D) plastic parts may further comprise vacuum pressing the flat plate onto the 3D forming buck. The method may comprise milling the final design into the 2D plate, prior to 3D forming. The 3D part of the design may be formed by heating the 2D part to an elevated temperature, for example 100° F. The 2D part may be loaded onto the 3D forming buck for a specified time, for example 30 seconds, to form the 3D part. Then, the 3D part may be cooled in water having a temperature of 40° F., or there about. The method may further comprise applying a pre-distortion factor onto the 2D part created using a flat plate. The pre-distortion factor may be applied before the 2D part is utilized such that the distortion of the 2D part that occurs, during the 3D forming process, results in a correctly fitting 3D part.

In another aspect, the method of forming three dimensional (3D) plastic parts may further comprise forming an ideal 3D part based on distortion simulation. The distortion simulation may comprise ideal heating temperature for the 2D part, ideal pressure applied for an ideal time during the loading, and ideal cooling temperature for the 3D part; the method may involve comparing if the formed 3D plastic part is different from the ideal 3D part. The distortion simulation may be updated based on the difference. This distortion simulation can then inform the distortion factor to be applied to the production of the 2D part in order to ensure the 3D part is formed properly.

BRIEF DESCRIPTION OF THE DRAWING FIGURES

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figure 1:
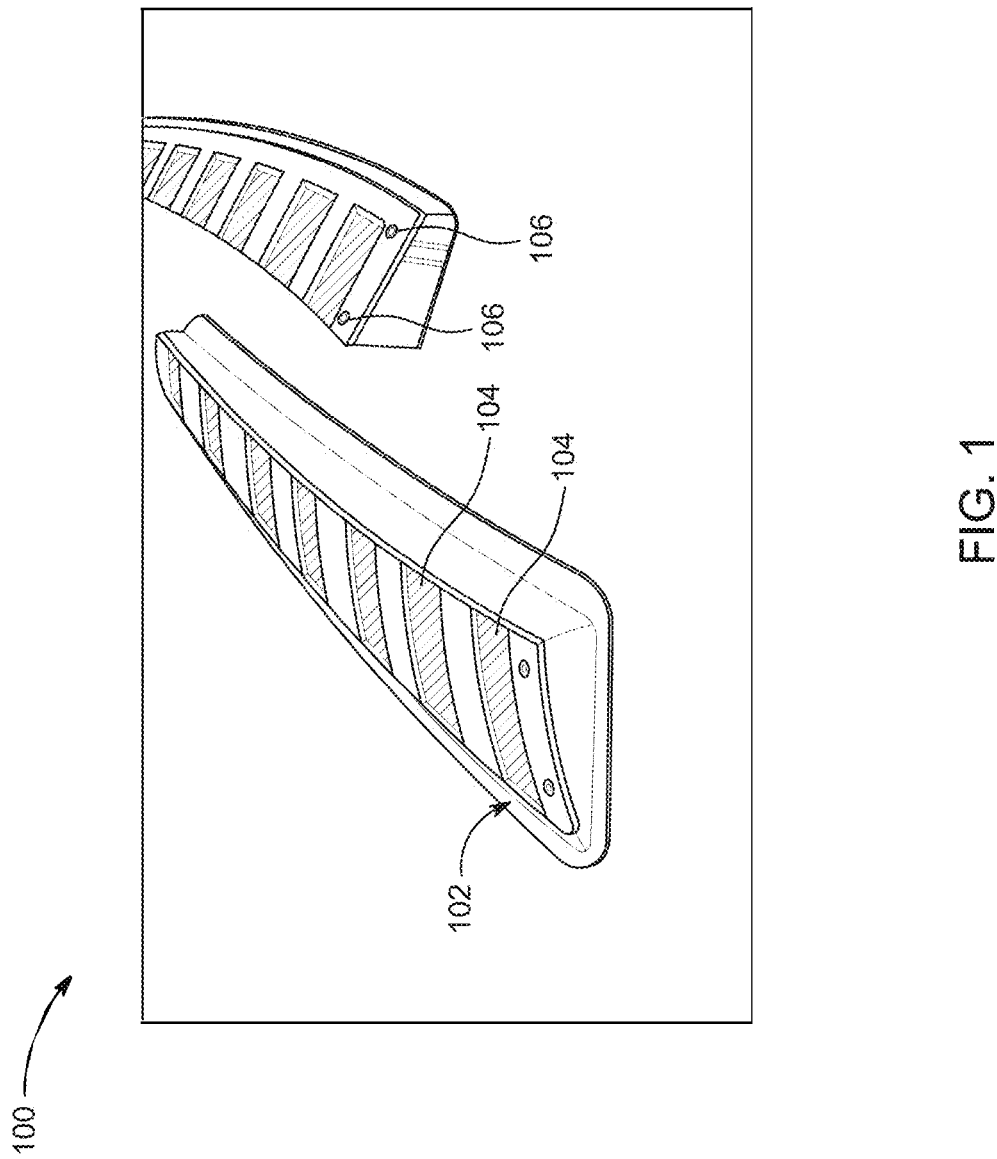
FIG. 1 is a perspective view of a 3D forming buck 100, according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

The preferred embodiment of the invention is not limited in its application to the details of construction and the arrangement of components set forth in the following description or illustrated in the following drawings. The preferred embodiment of the invention is capable of other embodiments and of being practiced or being carried out in various ways. In addition, it is to be understood that the phraseology and terminology used herein is for the purpose of description and should not be regarded as limiting. The use of "including," "having," or "comprising" and variations thereof herein is meant to encompass the items listed thereafter and equivalents thereof as well as additional items. Unless specified or limited otherwise, the terms "connected," "supported," and "coupled" and variations thereof, are used broadly and encompass both direct and indirect mountings, connections, supports, and couplings. It is also to be understood that "connected" and "coupled" are not restricted to physical or mechanical connections or couplings. Further, the use of absolute terms such as "must," "will," and the like, as well as specific quantities, plurals or singulars, are to be construed as being applicable to one or more of such embodiments, but not necessarily to all such embodiments. As such, embodiments of the invention may omit, or include a modification of, one or more features or functionalities described in the context of such absolute terms.

Described herein are systems and methods to form plastic parts. Such plastic parts may be of vehicles or other objects of household or commercial application. The plastic parts developed using the below described systems and methods are cost effective in low volume, have excellent fit and finish, and use many components from 2D construction. For example, embodiments of the present invention may be utilized to form, but are not limited to, pre-machined 2D plastic parts, such as those described in U.S. application Ser. No. 2017/0043813 which is incorporated by reference in its entirety, into a 3-dimensional ("3D") part. The method and system described herein may be useful for any other scenario that would benefit from cost effective production of highly accurate plastic components.

In one embodiment of the invention, a user may desire to add 3-dimensional contouring to an otherwise 2-dimensional part. By utilizing the system or method according to an embodiment of the present invention, a user may utilize existing 2-dimensional machining equipment to produce 2D parts that can then be post-machine-formed into a 3-dimensional part through the use of limited additional machinery. Herein 2D refers to a flat structure, which has a depth, and may have a design or complex structure along that depth (various positions along the length or width being a different depth) but is considered 2D due to its flat nature. For example, a rectangle measuring 2" long 2" wide and ½" deep (height), would technically be 3D but, assuming it is generally flat along its top and bottom surface, it is considered 2D for the purposes of this application. Following on from the same rectangle example, if that rectangle was distorted to twist up and away from a flat surface, it would then be considered 3D.

For example, some plastic parts require extremely precise fitment which may allow for 2D construction, while others require a 3D form in order to fit more precisely or to prevent the need for multiple 2D sections. Other benefits of 3D may include a reduction in the number of fasteners required, or the ability for parts to get closer to the edge of a radius, or generally better fit the desired shape. Previously, however, 3D components were cost prohibitive, especially in low volume where the pieces need to fit exactly. The present invention allows a user to benefit from 3D components at a fraction of the price of previous methods.

According to an embodiment of the present invention. A 2D sheet can be machined according to a design. That design is finish-machined in 2D. Thereafter, the 2D part can be taken to an elevated temperature and then placed on a mold and vacuum sealed before being taken back down to a more normal temperature, for example at or below room temperature. When completed, the pre-machined part would derive a 3D shape.

Where a 3D form is required, using an embodiment of the present invention, a user can account for any distortion that occurs during the process of forming a 3D part when machining the 2D part. Said another way, in one embodiment of the invention, the pre-machined 2D part is machined pre-distorted to account for distortion that occurs from converting a 2D flat structure into a true 3D form. According to this embodiment, the pre-distorted 2D part is then heated, placed on a forming buck, where pressure is applied, and then cooled. The final 3D part fits precisely and does not require any post-process-trimming. This method allows for intricate or complicated edge profiles to be maintained.

In some embodiments of the invention, the process includes the use of a forming buck. Where a forming buck is used, the 2D part is placed on the forming buck in order to take the overall shape of the buck.

Turning to FIG. 1, a 3D forming buck 100 is illustrated, in an embodiment. The 3D forming buck 100 may be made out of wood 102. As illustrated, 3D forming buck 100 has cladding design 104 on top with locations for fasteners 106. In an embodiment, the 3D forming buck 100 has at least one of contour, distortion, perforation, location for fastener, plurality of axes, and plurality of planes.

As the 2D part takes the shape of the forming buck it transitions into 3D. In some embodiments the 2D part is pre-heated before being placed on the buck. In other embodiments the forming buck may be heated, or conversely may be cooled, or both. In many embodiments the forming buck is reusable. A catalog or inventory of forming bucks can be created for various designs. This allows for cost savings. Further, if the design requirements change, it may be possible to modify the forming buck without adjusting the 2D component, or vis-a-versa. For example, if the destination of the plastic part is redesigned, such that a new contour is needed, it may be possible to simply adjust the forming buck. Or, conversely, if, for example, the contour or 3D aspect remains the same, but the location of a mounting hole changes, then only the 2D component would need to change, and the forming buck could remain. This allows for significant cost savings since little re-tooling is required, and the components that are "retooled" are inexpensive. A forming buck, for example, can be a milled block of wood, extremely inexpensive, compared to a static injection mold that becomes useless if design requirements change.

In order to ensure proper fitment, size, or general final appearance of 3D parts, a catalog of designs, forming bucks, and parameters may be created for specific applications or for individual design needs. The design may include, but is not limited to, for example, the overall shape of the part to be 2D machined, position of mounting holes or other features, and overall contour, as well as any necessary pre-distortion components. If the mounting hole for a fastener needs to be moved for example, that can be accomplished by adjusting the CAD file without requiring re-tooling or a new mold.

According to the present invention, in order to create a plastic part that must match a 3D contour, a user can scan the area where the plastic part is to be applied using a 3D modeling laser. For example, a handheld device known in the art. This generates a 3D computer model of the part.

Figure 2:
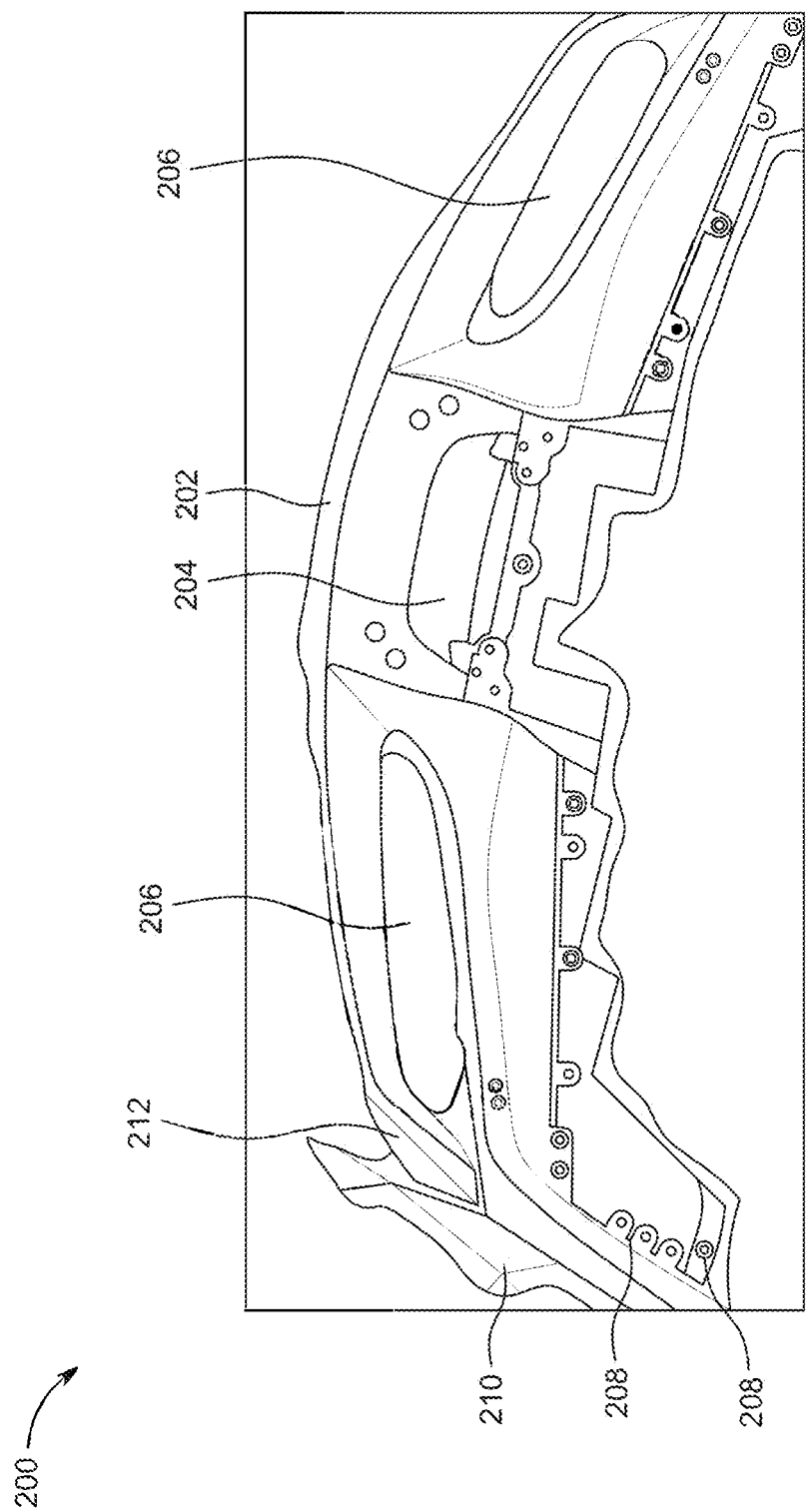
FIG. 2 is a perspective view of a vehicle's lower front bumper 200, according to an embodiment.

Turning to FIG. 2, a design 200 is illustrated, in an embodiment. The design 200 is of a part of a vehicle. As illustrated, design 200 includes contour 202, distortion 204, perforations 206, fasteners 208, and present in plurality of axes and plurality of planes 210 and 212.

Figure 3:
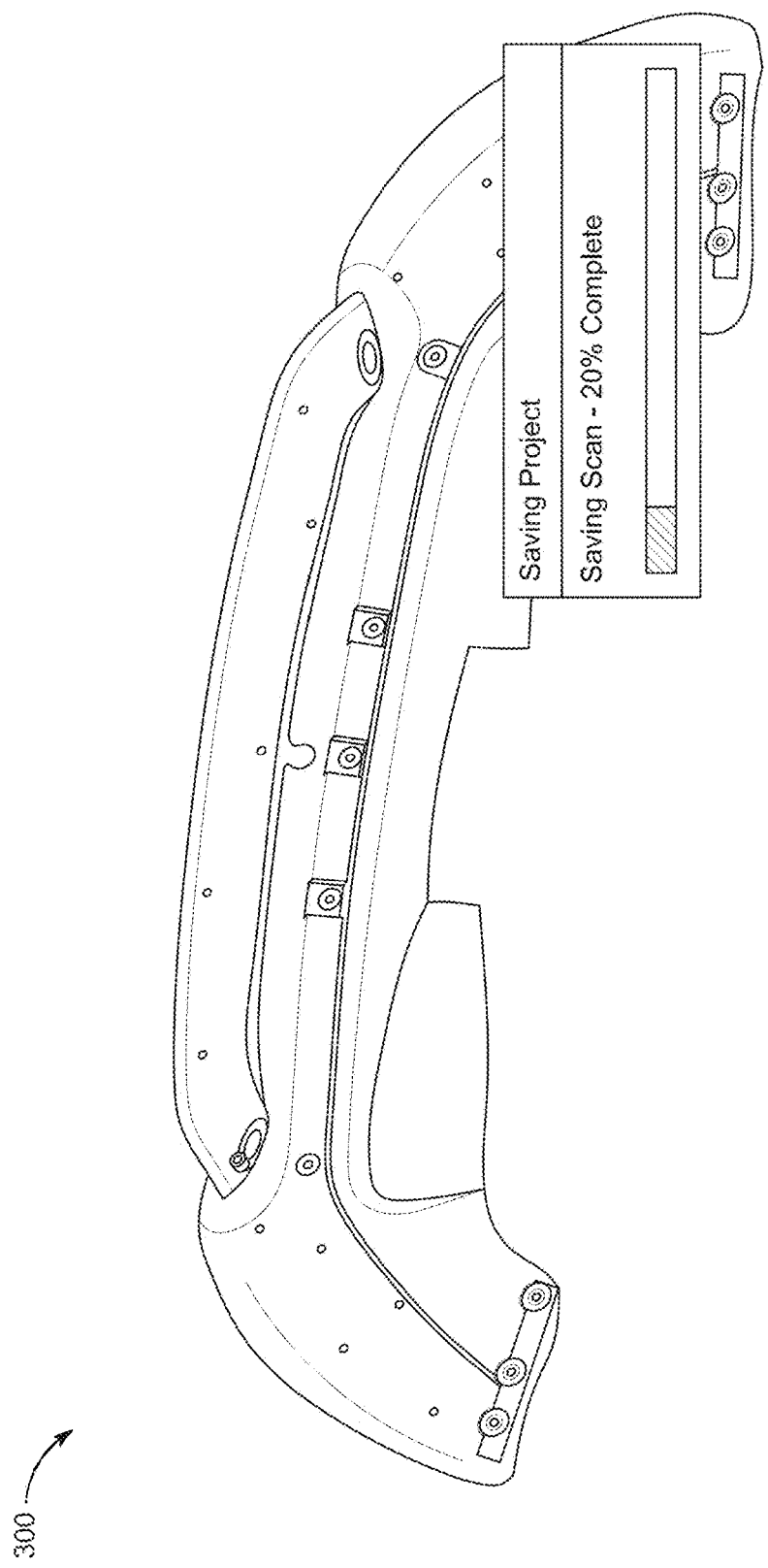
FIG. 3 is a 3D scan 300 of the vehicle's lower front bumper 200, according to an embodiment.

As depicted, in various embodiments, the factory mounting locations, contour and shape are captured in a digital format. Various other methods are possible, for example, the design can be created by hand in a program such as CAD, or a physical model can be created, and molds made, or a wire reconstruction can be made and scanned in 2D. Or, alternatively, the 2D and 3D components can be created completely independently from one another. As an example, FIG. 3 illustrates a perspective view of a vehicle's lower front bumper 200. A user may 3D scan the vehicle's lower front bumper 200 to develop the design.

In one embodiment, a 3D model can be deconstructed, or sectioned, into its 2D and 3D components. The 2D component generally reflecting the required 2D shape, and the 3D component generally reflecting the 3D contours that the 2D shape must take. In some embodiments, a pre-distortion factor may be applied to the 2D portion to account for distortion when the 2D component is generated in 3D. The 2D component can then be created out of a flat plate, alternatively referred as flat sheet. In some embodiments, a multi-axis mill could be used, for example, or a table router, or anything else capable of cutting the desired shape and any necessary design features into the 2D part.

The 3D portion, on the other hand, can be used to create a forming buck. The forming buck is used, generally, to form the 2D part into a 3D shape. The forming buck may be machined in a similar manner to the 2D flat sheet, and may be made out of wood, for example. Many other machining processes and materials can be used, however. For example, aluminum or plastic may be used, and could be formed using a multi-axis milling machine, sand casting or any other method. The 3D contours are captured in the forming buck. The pre-distorted 2D plate can then be applied to the forming buck in order to take the 3D shape. In some embodiments, the 2D plate may not be pre-distorted at all. Where pre-distortion is used, the pre-distortion can, for example, account for the heating, cooling, and/or stretching of the 2D part as it is pressed into the forming buck.

In an embodiment, the 2D part of the design is milled corresponding the 2D component from a 2D piece of stock. The 2D piece of stock may be at least one of thermoplastic olefins (TPOs), polycarbonates, polyesters, polypropylene, polyurethanes, polyamides, glass fiber and aluminum.

The pre-distortion factor insures that the final component fits the 3D piece where it needs to be applied. Once, calculated, the pre-distortion factor is applied to the 2D file which is used to cut the 2D part. During the conversion from 2D to 3D, without pre-distortion, the end product may not provide a precise fit due to any potential distortion that may occur when creating a 3D shape from flat stock. Further, in some instances, the amount of distortion due to heating, for example, is not uniform, and therefore must be accounted for. For example, where a product is U-shaped, the tails of the "U" may distort outward more than the portion closer to the center. The pre-distortion factor can be generated in a number of ways. For example, by manually adjusting the 2D CAD file according to known circumstances (thermal growth, 2D to 3D flattening, etc.). For example, the thermal expansion and contraction ratio may be known. Or, a program can be applied to the 2D CAD file that pre-distorts the drawing. Or, a non-pre-distorted test product can be created according to the method of the present invention, and the end test product can then be compared to the ideal end product, the deficiencies noted, and then accounted for as a pre-distortion factor. Other methods of determining a pre-distortion factor are available; those described here are simply a small number of the possible embodiments.

Due to thermal expansion properties of various types of plastic products, a consistent temperature profile may be beneficial during the forming process. For example, in some embodiments a heating oven may be used to bring the 2D part up to temperature in order to increase its pliability and therefore its ability to take on a 3D shape.

In various embodiments, it may be possible to reduce thermal expansion, and therefore it may be possible to avoid a distortion factor, by shocking the 3D part immediately after removing it from the forming buck. For example, the recently 3D-formed part may be immediately placed in an ice bath, or a cooler, refrigerator or the like. In some examples, the refrigeration may be carefully controlled, and powerful enough such that placing multiple or many recently formed 3D parts into the refrigerator does not elevate the temperature. In additional embodiments, the 3D part may be cooled while still on the forming buck. For example, the forming buck may be placed in a refrigerator, or a second forming buck may be in the refrigerator.

In many embodiments it is important that the temperature be consistent in order to ensure the end product is easily reproducible, and that any thermal expansion is as uniform as possible. For example, hot spots in an oven could cause one area of a part to be warmer than anticipated, and as a result, grow more than is acceptable.

In much the same way, where the 2D plate is pre-heated, the time the part spends on the forming buck, may be carefully controlled. For example, timing circuits could be used to ensure uniform forming time. Additional factors that may be considered include the time between removing the 3D part and cooling it and to what temperature the part is cooled. For example, in one embodiment the 2D part may be heated to 100° F., applied to the forming buck for 30 seconds and then immediately placed in 40° F. water for 1 minute.

In certain embodiments, the forming buck may be heated or cooled. For example, instead of removing the 3D formed part and cooling it in a water bath, the forming buck could be internally cooled such that the temperature of the 3D part can be carefully controlled and brought down to a final temperature such that it contracts into the final shape. This may be accomplished by using a circuit, or computer programming combined with heating elements and coiling circuits. In other embodiments, the forming buck can be heated, such that an oven, or other elevated temperature area is not required. In further embodiments, the forming buck can be both heated and cooled. For example, a heating coil and a cooling circuit can be used.

The process of forcing the 2D plate to take the shape of the forming buck, according to one preferred embodiment, may utilize a vacuum press such that the 2D plate is placed on top of the forming buck, and a bladder is lowered over the two pieces. The air is then sucked out of the bladder, forcing the 2D plate to take the shape of the forming buck, creating the 3D part. The vacuum is then released, allowing the 3D part to be removed and cooled. In at least one embodiment, the time period can be automatically controlled and set, such that pressure is applied to an exact period of time. Or, alternatively, other sensors can be used such as temperature probes, or imaging sensors to remove or otherwise adjust, including increase, pressure once the part reaches a certain temperature, size, shape, etc. Additional methods of forcing the forming buck into, or onto the 2D plate are possible, and should not be limited to the described embodiment. For example, the 2D plate could remain stagnant, having been delivered to the forming area, and the forming buck, potentially pre-heated, could be pressed into the 2D plate in order to transition the plate into a 3D part.

Using this process, a company currently engaged in the production of 2D plastic parts can create new 3D parts with limited additional expense, and using the same base materials. As a result, production in low volume is viable. The final product resembles a fully billet CNC product, without the need for multi-axis CNC. Further, the creation of the forming buck, from a wood block, for example, is significantly cheaper should the design of a component change and necessitate a new forming buck. Further, smaller changes, such as those that do not change the overall shape, but only the location of mounting holes, for example, can be accomplished without the need for a new forming buck at all. These smaller changes would only require the 2D design to be adjusted, for example in a CAD file, prior to the manufacture of the 2D part. This represents a considerable savings over the traditional injection mold method.

Figure 4:
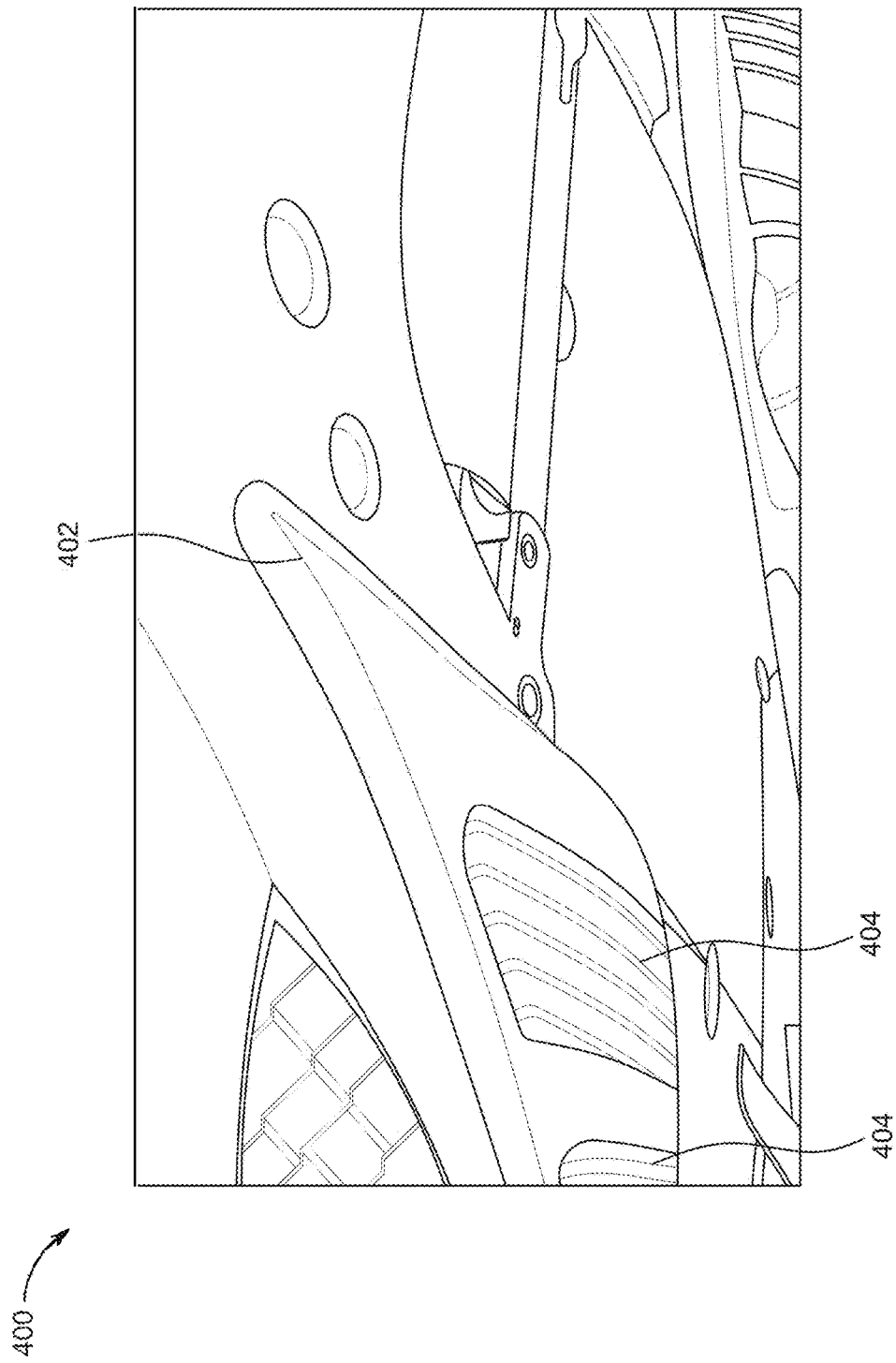
FIG. 4 is a perspective view of a vehicular component 400 developed using the 3D forming buck 100, according to an embodiment.
Figure 5A:
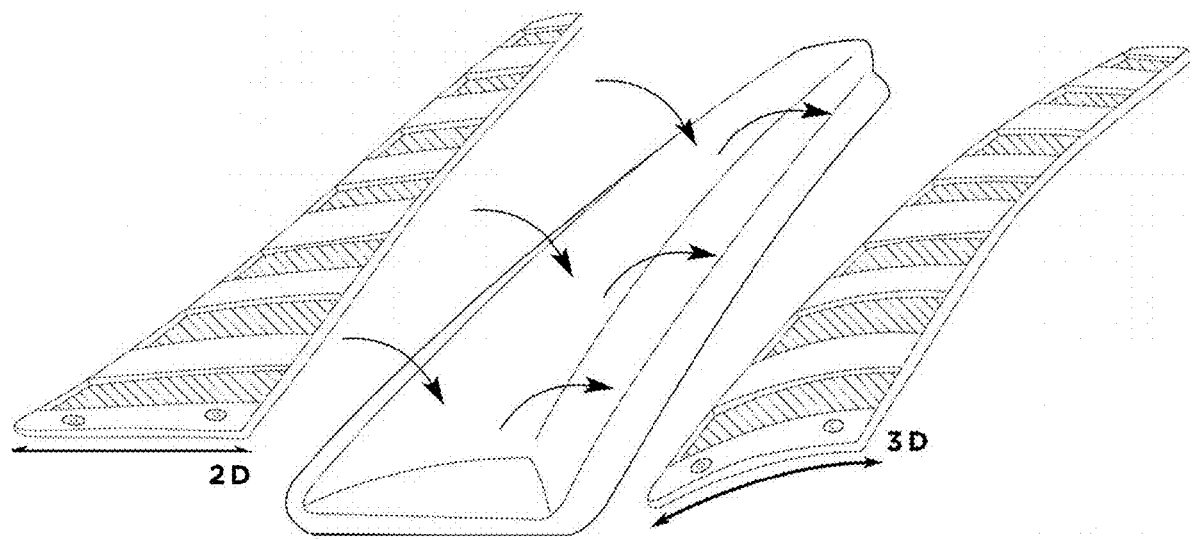
FIG. 5A illustrates a 2D part loaded onto a buck, and then separated from the buck as a 3D part.
Figure 5B:
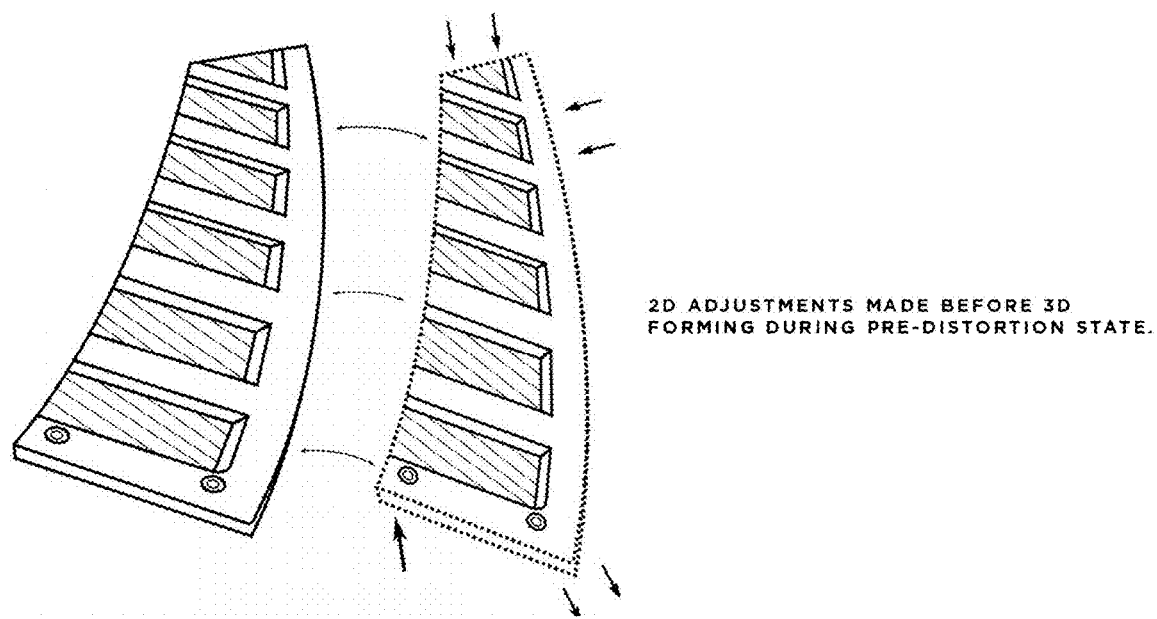
FIG. 5B illustrates applying a pre-distortion factor onto the 2D part (i.e., 2D adjustments made before 3D forming during pre-distortion state).

Further, by finish cutting the product prior to 3D forming, no additional trimming is required, and the edge can take on more intricate shapes and contours. FIG. 4 illustrates an end product consistent with the teachings of the present invention that has not required any post-process machining, fitted to a car. FIG. 4 illustrates the contour of the part.

Turning to FIG. 4, a portion 400 of fascia of a vehicle is illustrated. After the method of forming three dimensional (3D) plastic parts finished, the 3D part 402 is fit over the desired area. As illustrated in FIG. 4, a design cladding 404 of 3D part 402 is formed utilizing the present method and system. The intricate shape and machined areas illustrated in FIG. 3 are machined in 2D, prior to the piece being formed.

The invention as described above may be manually carried out, or could be fully automated. For example, through the use of conveyor belts, timing circuits, and sensors, the entire process may be accomplished automatically.

In accordance with one embodiment a method according to the present invention may be comprised of the following steps: 1) rendering a new design, 2) breaking the design into the 2D and 3D forming buck components, 3) determining a pre-distortion factor, if necessary, 4) applying the pre-distortion factor, if necessary, to the 2D component, 5) manufacturing a finished 2D part according to the 2D component, 6) manufacturing a forming buck according to the 3D design component, or selecting a pre-manufactured forming buck, 7) heating the 2D part, 8) applying the heated 2D part to the forming buck, 9) forcing the 2D part into the forming buck, 10) removing the now 3D part from the forming buck, and, 11) cooling the 3D part. The steps are only one embodiment of the present invention. Other orders, steps, and methods are possible. For example, one or more steps may be combined, if the forming buck is heated and or cooled for example. Or, one or more steps may not be necessary. For example, if the design is already catalogued, the method could start at step 5. Further, in various embodiments, for example, a pre-distortion factor may not be required, or a forming buck may already exist for that design, and therefore it is not necessary to create a new one.

In other embodiments, the pre-distortion factor may be applied to the 3D forming buck design, such that the forming buck allows the 2D component to grow or form into a specified shape that takes into account any distortion that occurs during the 2D to 3D transformation.

In some embodiments of a system according to the method described above, every step is automated. In other embodiments, the steps are either manual, or a combination of automated and manual.

In the foregoing specification, the invention has been described with reference to specific exemplary embodiments. Various modifications and changes may be made, however, without departing from the scope of the present invention as set forth in the claims. For example, the embodiments of the present invention have been described with respect to automotive parts, but the invention is not so limited and could be used to produce any plastic parts that are capable of being pre-machined in 2D before being formed. The specification and figures are illustrative, not restrictive, and modifications are intended to be included within the scope of the present invention. Accordingly, the scope of the invention should be determined by the claims and their legal equivalents rather than by merely the examples described.

Benefits, other advantages, and solutions to problems have been described above with regard to particular embodiments. Any benefit, advantage, solution to a problem, or any element that may cause any particular benefit, advantage, or solution to occur or to become more pronounced are not to be construed as critical, required, or essential features or components of any or all of the claims.

While the preferred embodiment of the invention has been illustrated and described, as noted above, many changes can be made without departing from the spirit and scope of the invention. For example, a protective panel may be used in other fields, or may not form a shape generally representative of a portion of a vehicle panel. Accordingly, the scope of the invention is not limited by the disclosure of the preferred embodiment.

What is claimed is:

1. A method of forming three dimensional (3D) plastic parts, the method comprising the steps of:
   selecting a design and modelling the design, wherein the design comprises 2D and 3D components;
   manufacturing a 3D forming buck corresponding to the 3D component, wherein the 3D forming buck has at least one of contour, distortion, perforation, and locations for fasteners, present in plurality of axes and plurality of planes;
   heating at least one of a 2D part and the 3D forming buck;
   loading the 2D part onto the 3D forming buck, for a predefined period of time;
   separating a 3D part formed after the loading, wherein the 3D part is the 2D part generally having taken the shape of the 3D forming buck; and cooling the 3D part wherein the 3D part of the design is formed by: heating the 2D part to 100° F.; loading the 2D part onto the 3D forming buck for at least 30 seconds to form the 3D part; and cooling the 3D part in water having a temperature of approximately 40° F.

2. The method of claim 1, wherein the modelling utilizes at least one of a computer aided design (CAD) file and scanning of physical models, molds, and wire reconstructions.

3. The method of claim 1, wherein the CAD file is changed for creating a 3D part of different design.

4. The method of claim 1, wherein the design is of a part of a vehicle.

5. The method of claim 1, wherein the 3D forming buck is obtained through one of multi-axis milling and sand casting.

6. The method of claim 1, wherein the 2D part utilizes a flat plate made using one of thermoplastic olefins (TPOs), polycarbonates, polyesters, polypropylene, polyurethanes, polyamides, and glass fiber.

7. The method of claim 1, wherein the 3D forming buck is made out of wood.

8. The method of claim 1, wherein the flat plate is subjected to a predefined temperature in order to increase pliability.

9. The method of claim 1, further comprising vacuum pressing the flat plate onto the 3D forming buck.

10. The method of claim 1, further comprising milling an undesired portion of the 3D part.

11. The method of claim 1, further comprising applying a pre-distortion factor onto the 2D part created using a flat plate.

12. The method of claim 11, wherein the pre-distortion factor is applied before the 2D part is utilized for creating the 3D part.

13. The method of claim 1, further comprising:
    forming an ideal 3D part based on distortion simulation, wherein the distortion simulation comprises ideal heating temperature for the 2D part, ideal pressure applied for an ideal time during the loading, and ideal cooling temperature for the 3D part;
    comparing if the formed 3D plastic part is different than the ideal 3D part; and
    updating the distortion simulation based on the difference.

* * * * *